United States Patent Office 3,266,901
Patented August 16, 1966

3,266,901
FEED CONTAINING NOCARDIA RUGOSA FREE FROM VITAMIN $B_{12}$
Remo Faustini, Nerviano-Milan, Giuseppe Gasparini, Milan, Angelo Tardani, Nerviano-Milan, and Riccardo Barchielli, Milan, Italy, assignors to Società Farmacetici Italia, Milan, Italy, a corporation of Italy
No Drawing. Filed Mar. 5, 1962, Ser. No. 177,184
Claims priority, application Italy, Mar. 22, 1961, 5,247/61
5 Claims. (Cl. 99—9)

Our invention relates to animal-growth promoting substances, that is, hydrolysates of mycelium of actinomycetes special *Nocardia rugosa*, to their process of preparation by alkaline hydrolysis, and to their use in breeding and fattening animals, as substances which promote and speed up body growth.

In the last ten years several substances have been found which have the property of stimulating animal growth, though said substances are apparently not necessary for nutrition of same. Among these substances, mention is made of some antibiotics added to feeds. Nevertheless the antibiotics do not give constant results, as their action is subordinated to different factors such as age of the animal (the maximum effect of the antibiotic is given during the first period of growth), the type of feed, and the breeding surroundings.

In Belgian Patent No. 547,383 a new process has been described, and assigned to the same assignee, to obtain cobaltamines, with the use of a new species of actinomycetes, namely *Nocardia rugosa*. Cultures of said new species have been deposited in Great Britain at the Commonwealth Mycological Institute (collection No. IMI 71674) and in this country at the Rutgers University (collection No. 3760).

We have discovered, and this is an object of the present invention, that hydrolysates of mycelia of *Nocardia rugosa*, free from vitamin B12, are very effective for promoting body-weight increases in animals and for improving the conversion index of foodstuffs. The velocity of body increase in animals brought about by feeds containing hydrolysates of mycelia of *Nocardia rugosa* is surprisingly superior to that brought about by feeds containing unhydrolysed mycelia of *Nocardia rugosa*, or by those containing vitamin B12, or by those containing pure nucleinic acids, and is of the same order of magnitude as those feeds containing antibiotics.

Our invention provides a process for obtaining hydrolysates of *Nocardia rugosa* mycelia which comprises alkaline hydrolysis of *Nocardia rugosa* as described hereinbelow. *Nocardia rugosa* mycelium, coming from the manufacture of cobaltamine and free therefrom, is treated with stirring at a temperature ranging from 20° and 40° C., preferably between 29° and 32° C., with a dilute solution of caustic alkali over a period ranging from 1 to 5 hours, preferably 2 hours. Thereafter hydrochloric acid is added until the pH reaches a value of from 5 to 7, preferably from 5.5 to 6. The products are filtered with a filter-press and the filtrate is concentrated to a small volume. The separated product is pulped and washed with a lower aliphatic alcohol, such as methanol, ethanol, and propanol, is filtered and dried while warm in vacuo.

On the average 1 kg. of finished product, free from vitamin B12 is obtained from 10 kg. of humid mycelium (about 65% of water). This substance is added to differtypes of animal feed, the composition thereof differs according to the type of animal, at the rate of 2–5% by weight in respect to the standard mixture. The feeds so obtained are very suitable for administration to very different breeds of animals, such as oxen, horses and swine. Feeds containing hydrolysates of *Nocardia rugosa* mycelium according to our invention are more active, as they present growth velocity of about 7–20% higher, than feeds containing unhydrolyzed dried mycelia of *Nocardia rugosa*. Comparison of the hydrolysates with the most used antibiotics in this field has shown an animal-growth increase of similar extent. Comparison between hydrolysates and vitamin B12 and pure nucleinic acids shows a greater power of promoting the growth due to the hydrolysates.

The association of hydrolysates of *Nocardia rugosa* mycelium with the antibiotics of tetracycline group has given superior results than those given by each single compound thereby showing a synergism phenomenon.

The following examples serve to illustrate, but are not intended to limit, our invention.

*Example 1*

A boiler of 80 liters capacity provided with shell for steam heating, a stirrer, a thermometer, and a joint for applying vacuum, was filled with 20 liters of water, 2.6 kg. of solution of 36° Baumé sodium hydroxide and 16 kg. of *Nocardia rugosa* exhausted mycelium (composed of 20.89% ash, 14.88% organic substance, and 64.23% water).

The temperature of the mass was raised to 29–32° C., and it was kept under stirring for 2 hours. Commercial hydrochloric acid was added ($D_{20}=1.18$) till the pH of the mixture was brought to a value ranging from 5.5 to 6. The liquid was filtered with a filter-press and the filter was washed with water until 65 liters of filtrate were collected. The liquid was again placed into the boiler and concentrated in vacuo, at an internal maximum temperature of 60° C. to 8 liters of residual volume. 8 liters of methanol were added to the residue and it was allowed to stand for at least 2 hours. The boiler was then emptied and the mass not dissolved in methanol was filtered off, dried at 60° C. in vacuo, and finally milled. 0.85–90 kg. of product free from vitamin B12 was obtained. The same results were obtained when potassium hydroxide was used instead of sodium hydroxide.

*Example 2*

The following four products were tested as feed additive in order to check the difference in promoting the body growth of the animals.

(1) Pure nucleinic acids, which were added to the feed mixture in the ratio of 0.80 g./kg. of standard mixture;
(2) Hydrolysates of *Nocardia rugosa* mycelium obtained with the process described in Example 1 and reported under the code (HNM); this HNM was added in the ratio of 20 g./kg. of standard mixture;
(3) *Nocardia rugosa* mycelium free from vitamin B12 was dried at 60° C. in vacuo to constant weight; this mycelium was added at the ratio of 85 g./kg. of standard mixture;
(4) Vitamin B12 which was added at the ratio of 20 g./kg. of standard mixture.

For this experiment 500 one-day chicks Wantress A. Acros of both sexes were used, being distributed at random in 5 groups, included controls, and bred in series over a period of 74 days. There were two feed mixtures, namely mixture 1 for the first period of test (1st–30th day) and mixture 2 for the second period of test (31st–74th day). The mixtures had the following composition in percentages by weight:

*Mixture 1*

| | |
|---|---|
| Herring flour | 5 |
| Soya | 18 |
| Milk serum | 2 |
| Alfalfa | 1 |
| Maize | 70.865 |
| Dicalcium phosphate | 2 |
| Yeast | 1 |
| Oligoelements [1] | 0.050 |
| Manganese glycerophosphate | 0.020 |
| Zinc carbonate | 0.015 |
| Sodium chloride | 0.050 |
| | 100.000 |

*Mixture 2*

| | |
|---|---|
| Meat flour | 3 |
| Herring flour | 1 |
| Soya | 15 |
| Milk serum | 2 |
| Alfalfa | 3 |
| Maize | 72.665 |
| Dicalcium phosphate | 2 |
| Yeast | 1 |
| Oligoelements [1] | 0.050 |
| Manganese glycerophosphate | 0.020 |
| Zinc carbonate | 0.015 |
| Sodium chloride | 0.250 |
| | 100.000 |

[1] Mixture of inorganic salts such as aluminum, barium, iron, iodine, cobalt, selenium, molybdenum.

20 g. of HBT (hydroxybutyltoluene) as antioxidizing agent have been added to each 100 kg. of mixture together with 1 kg. of vitamin complex having the following composition per kg. of product:

| | | |
|---|---|---|
| Vitamin A (stabilized) | I.U. | 1,000,000 |
| Vitamin $D_3$ (stabilized) | I.U. | 100,000 |
| Riboflavin | g. | 0.5 |
| Vitamin PP | g. | 2 |
| D-calcium pantothenate | g. | 1.5 |
| Choline-chloride | g. | 75 |
| D,L-methionine | g. | 25 |
| Vehicle q.p. | g. | 1000 |

The chicks were weighed individually the 30th, 60th and 74th day and the obtained data are reported in Table 1.

TABLE 1

| Groups | Live weight expressed in g. at— | | |
|---|---|---|---|
| | 30th day | 60th day | 74th day |
| 1 (control) | 385 | 1,206 | 1,545 |
| 2 (pure nucleinic acids) | 423 | 1,210 | 1,550 |
| 3 (hydrolysates of *Nocardia mycelium*) | 482 | 1,308 | 1,680 |
| 4 (*Nocardia mycelium*) | 404 | 1,224 | 1,568 |
| 5 (Vitamin B12) | 420 | 1,210 | 1,548 |

Table No. 2 reports the average conversion index which indicates the number of kilograms of food necessary for producing a kilogram of bodily weight.

TABLE 2

| Groups | 30th day | 60th day | 74th day | Medium |
|---|---|---|---|---|
| 1 (control) | 2.3 | 2.5 | 2.9 | 2.5 |
| 2 (pure nucleinic acid) | 2.1 | 2.6 | 2.8 | 2.5 |
| 3 (hydrolysates of *Nocardia mycelia*) | 1.8 | 2.4 | 2.2 | 2.2 |
| 4 (*Nocardia mycelia*) | 2.12 | 2.58 | 2.8 | 2.5 |
| 5 (Vitamin B12) | 2.12 | 2.62 | 2.82 | 2.5 |

Example 3

The experiment was carried out on 56 pigs, sub-divided in four groups (including control) of 14 subjects each (7 males and 7 females). All the animals were of the "Large White" species.

At the beginning of the experiment their average weight was 24 kg. (age about 3 months). The mixture was administered as required (dry mixture slightly oiled with 0.5% deacidified soya oil in order to reduce the pulverulence of the feed, which is chiefly due to the presence of high percentage of finely milled alfalfa-hay).

The composition of the mixture was as follows, in weight percent:

| | |
|---|---|
| Maize | 20 |
| Barley | 10 |
| Bran | 29 |
| Alfalfa-hay | 25 |
| Linseed-cake | 1 |
| Soya | 7.950 |
| Meat | 2.250 |
| Herrings | 0.750 |
| Dried milk serum | 0.750 |
| Torula yeast | 0.750 |
| Vitamin complex | 0.750 |
| Dicalcum phosphate | 0.540 |
| Tricalcium phosphate | 0.180 |
| Calcium carbonate | 0.685 |
| Sodium chloride | 0.360 |
| Oligoelements | 0.35 | the oligoelements and vitamin complex being the same as in Example 2.

The first group, control group (C), has received the mixture described above;

The second group (A) the same mixture with an addition of chlortetracycline at the ratio of 2 g./100 kg. of mixture;

The third group (HNM) the same mixture with an addition of hydrolysates of *Nocardia rugosa* mycelium, at the rate of 500 g./100 kg. of mixture, and The fourth group (A+HNM) the same mixture as the third group with an addition of 1 g. of chlorotetracyclin for each 100 kg. of mixture.

The animals were weighed after a fast of about 20 hours. The obtained results are summarized in the following Table 3:

TABLE 3

| | C | A | NHM | HNM+A |
|---|---|---|---|---|
| Average weight "per head" in kg.: | | | | |
| At the beginning of the experiment | 25.9 | 24.8 | 25.7 | 23.3 |
| After 15 days (I weighing) | 30.5 | 31.1 | 31.7 | 30.0 |
| After 56 days (II weighing) | 49.5 | 48.8 | 49.9 | 48.5 |
| After 84 days (III weighing) | 61.8 | 60.8 | 60.4 | 59.8 |
| After 112 days (IV weighing) | 70.3 | 69.00 | 70.39 | 69.42 |
| Average weight increase in g. per day per head: | | | | |
| During the first 15 days | 328 | 447 | 429 | 479 |
| Till the 56th day | 422 | 428 | 432 | 453 |
| Till the 84th day | 427 | 428 | 413 | 421 |
| Till the 112th day | 395 | 394 | 398 | 406 |
| Average conversion index: | | | | |
| During the first 15 days | 5.46 | 3.96 | 4.15 | 3.88 |
| Till the 56th day | 5.23 | 5.21 | 5.13 | 5.02 |
| Till the 85th day | 5.61 | 5.62 | 5.82 | 5.80 |
| Till the 112th day | 6.43 | 6.49 | 6.41 | 6.51 |

From the preceding table the following has been deduced:

(1) Till about 30 kg. weight of living animal the rate of average increase in group A was 31% in comparison with the control. Hydrolysates of *Nocardia rugosa* mycelium (HNM) have yield also an increase of 30%; their association with chlorotetracycline produced an increase of 45%.

(2) The percentage increase of conversion index in comparison with the controls, was 26.2% for group A, 24.0% for group HNM and 28.0% for group HNM+A.

(3) Most interesting are the results given by group HNM+A in these experimental conditions. Similar synergism was observed with other antibiotics, too, such as tetracycline and hydroxytetracycline.

We claim:

1. A process of preparing a hydrolysate of *Nocardia rugosa* mycelium free from vitamin B12, which comprises alkaline hydrolysis of *Nocardia rugosa* mycelium free from vitamin B12, acidifying the hydrolized mixture, separating the liquid component of the mixture, concentrating said liquid component whereby a solid product separates, washing the solid-containing concentrated liquid component with a lower aliphatic alcohol, filtering off and drying the solid product.

2. A process of preparing a hydrolysate of *Nocardia rugosa* mycelium free from vitamin B12, which comprises alkaline hydrolysis of *Nocardia rugosa* mycelium free from vitamin B12 at a temperature between 20° and 40° C. for a period from 1 to 5 hours, acidifying the hydrolized mixture by adjusting the pH to between 5 and 7, separating the liquid component from the mixture, concentrating said liquid component whereby a solid product separates, washing the solid-containing concentrated liquid component with a lower aliphatic alcohol, filtering and drying the solid product.

3. A process of preparing a hydrolystate of *Nocardia rugosa* mycelium free from vitamin B12, which comprises alkaline hydrolysis of *Nocardia rugosa* mycelium free from vitamin B12 at a temperature between about 20° and 32° C. for a period from 1 to 5 hours, acidifying the hydrolized mixture by adjusting the pH to between 5 and 7, separating the liquid from the mixture, concentrating the liquid whereby a solid product separates, washing the solid-containing concentrated liquid with methanol, separating, drying and milling the solid product.

4. Animal feeds containing alkaline hydrolysates of *Nocardia rugosa* mycelium free from vitamin B12 as a growth-promoting substance.

5. Animal feeds containing alkaline hydrolysates of *Nocardia rugosa* mycelium free from vitamin B12 in admixture with antibiotics as a growth-promoting substance.

References Cited by the Examiner

UNITED STATES PATENTS

| | | | |
|---|---|---|---|
| 2,396,234 | 3/1946 | Allan et al. | 99—9 X |
| 2,886,490 | 5/1959 | Marco et al. | |
| 2,940,858 | 6/1960 | Flechsig | 99—9 |
| 3,085,049 | 4/1963 | Rudy et al. | 99—9 |
| 3,088,879 | 5/1963 | Weaver | 99—9 |

A. LOUIS MONACELL, *Primary Examiner.*

HYMAN LORD, *Examiner.*

D. J. DONOVAN, *Assistant Examiner.*